May 14, 1968     V. C. ANDERSON     3,382,943
REMOTE UNDERWATER POSITIONING AND MANIPULATION MODULE
Filed April 1, 1966     4 Sheets-Sheet 1

INVENTOR.
VICTOR C. ANDERSON
BY
Richard L. MacNeill

INVENTOR.
VICTOR C. ANDERSON
BY
Richard K. MacNeill

May 14, 1968     V. C. ANDERSON     3,382,943

REMOTE UNDERWATER POSITIONING AND MANIPULATION MODULE

Filed April 1, 1966     4 Sheets-Sheet 4

INVENTOR.
VICTOR C. ANDERSON
BY
Richard K. MacNeill

United States Patent Office 3,382,943
Patented May 14, 1968

3,382,943
REMOTE UNDERWATER POSITIONING AND
MANIPULATION MODULE
Victor C. Anderson, 2325 Poinsettia Drive,
San Diego, Calif. 92106
Filed Apr. 1, 1966, Ser. No. 547,384
5 Claims. (Cl. 180—2)

ABSTRACT OF THE DISCLOSURE

A remote underwater positioning and manipulation module carrying a pair of drive wheels on one end and a pair of idler wheels at the other end with an electric motor mounted within the housing and coupled to the drive wheels, and an endless track coupled to the drive and idler wheels and completely surrounding the module, the module carrying the wheels via a pair of axles which are mounted in circular bellows having concentric convolutions located in the sides of the module effecting a flexible coupling of the wheels to the housing as well as providing flexible diaphragms to accommodate pressure changes due to varying depths of operation.

---

The present invention relates to a remote underwater positioning and manipulating module and more particularly to a remote underwater positioning and manipulation module which can be conveniently coupled to like modules for producing any desired size and shape of underwater vehicle.

According to the invention, an underwater positioning and manipulation module is provided having an endless track which is driven by a pair of drive wheels coupled to an electrical motor. At an opposite end of the module a pair of idler wheels are also coupled to the track. A sealed housing is located between the drive and idler wheels containing an electric motor together with a plurality of serially connected chain-coupled reduction sprockets, the last of which is coupled to the drive wheels of the module. The idler wheels of the module are coupled to an axle which is rotatably mounted in a pair of bellows comprising sections of the sidewalls of the outer casing. A drive axle is likewise rotatably mounted to a pair of bellows comprising a section of the outer casing. These bellows allow for flexibility of the unit in the transverse axis of the module. It has been found empirically that the bellows also serve as flexible diaphragms to effect a transfer of outside pressure to the inside thereby equalizing pressure across the housing. This removes any depth limitation caused by outside pressure on the housing or axle seals. The idler wheel axle is pivotally attached to a compressed coil spring which tends to displace the rear bellows, tightening the outside track. Should the unit be passing over rough terrain such as that encountered in an ocean bottom, for example, this will allow flexibility of the track because of the flexibility of the rear axle along the transverse axis. The electric motor is mounted to an inside mounting frame as is the compressed coil spring. This, together with the chain-coupling between the electric motor and the front wheel axle, allows for a certain amount of angular distortion of the inside mounting frame itself without affecting the operation of the unit. The chain coupling also renders a reverse drive possible through the utilization of a split-phase induction motor and associated control circuitry.

The outside casing is held to the inner frame by a plurality of mounting bolts which are threadably engaged with the inner frame through an aperture in the outside shell. The mounting bolts have a threaded recess for threadable engagement with mounting screws utilized for mounting a linking platform for linking two or more modules together without disturbing the water-tight integrity of each outer shell. A hermetically sealed underwater connector is utilized for applying electric power through the outside shell of each module to its individual electric motor. It is contemplated that the linking platform will include a water-tight compartment for the housing of various electrical equipment utilized in conjunction with the completed underwater vehicle.

A further novel feature of the present invention lies in the track itself. Two endless loops of fiber-reinforced resilient material are utilized as the basic track linkage. Each loop has a plurality of extensions or ribs to which are coupled sections of cylindrical cleats at spaced intervals. The cylindrical cleats are necessarily slotted on each end thereof to slip around and over the endless loops. A plug dimensioned for a snug fit is then inserted into each end of each cleat to lend structural strength to the cleat. The plug is preferably contoured for a snug fit around each of the ribs for distributing force over a large area resulting in less stress and strain and a more uniform and efficient track. Alternatively, the plug may be notched directly to the endless loops eliminating the need for separate plugs, thereby simplifying assembly.

An object of the present invention is the provision of a remote underwater positioning and manipulation module which can be conveniently coupled to other modules for varying the shape and size of an underwater vehicle according to need.

Another object is to provide a remote underwater positioning and manipulation module in which all of the moving parts are flexibly coupled to allow relative transverse and angular distortion without affecting their operation.

A further object of the invention is the provision of a remote underwater positioning and manipulation module which can be rigidly coupled to other modules without destroying water-tight integrity.

Yet another object is to provide a remote underwater positioning and manipulation module having a reversible drive means.

Still another object is to provide a remote underwater positioning and manipulation module which is inexpensive to manufacture, install, and assemble, and requires a minimum of maintenance and adjustment.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
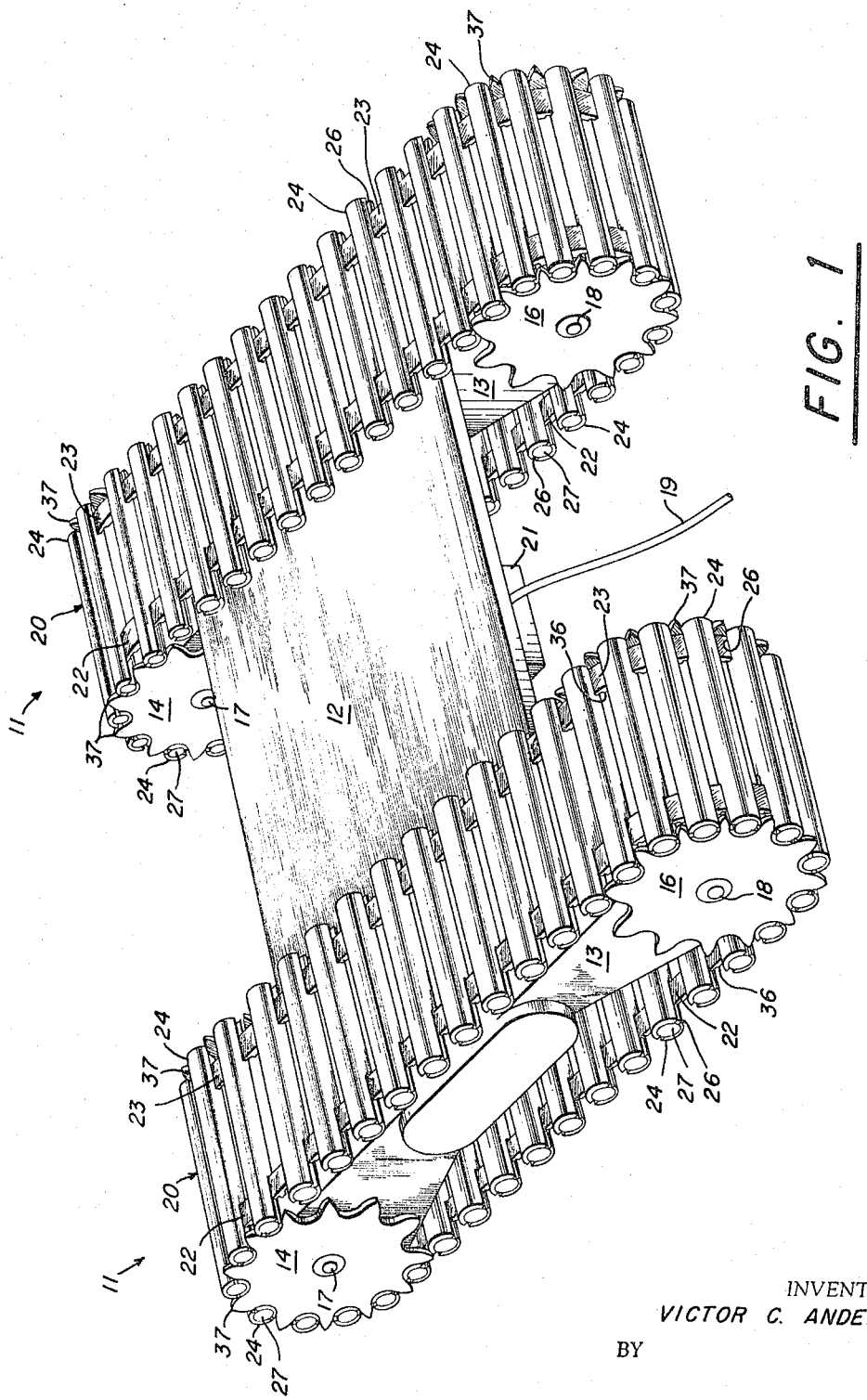
FIG. 1 is a pictorial view in perspective of two of the modules of the present invention linked together.

Referring to FIG. 1, a pair of remote underwater positioning and manipulating modules 11 are shown coupled together by a linking platform 12. Each module 11 has a water-tight outer casing 13 with a pair of front wheels 14 and a pair of back wheels 16 carried by axles 17 and 18 respectively. An electrical cable 19 is coupled through a water-tight compartment 21 carried by linking platform 12. Tracks 20 are coupled to each pair of wheels 14 and 16 and comprise resilient strips 22 and 23 which in turn carry cylindrical cleats 24.

Figure 2:
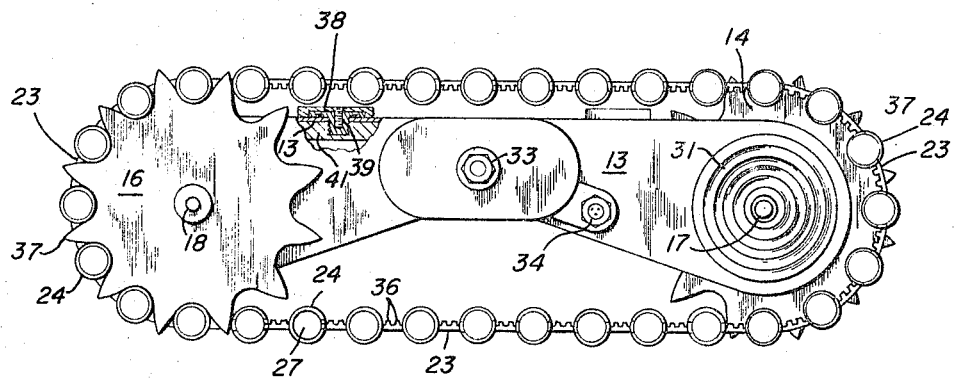
FIG. 2 is a side elevation view partially sectioned of the embodiment of FIG. 1.
Figure 3:
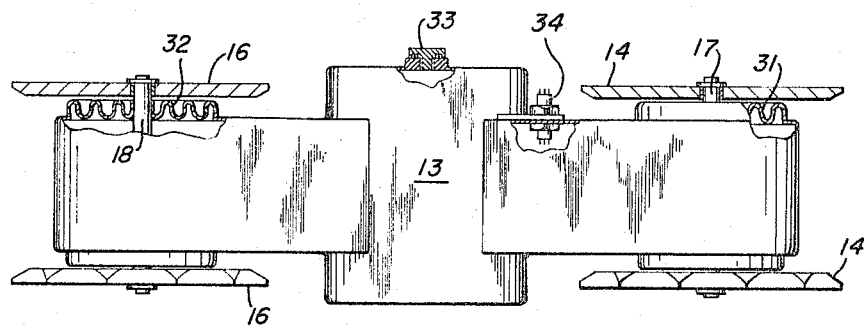
FIG. 3 is a bottom view partially sectioned of a preferred embodiment of the present invention.
Figure 6:
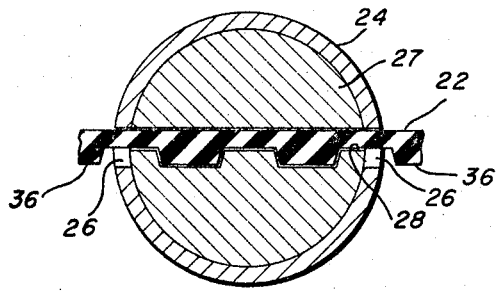
FIG. 6 is a cross-sectional view of an assembled cleat taken along lines 6—6 of FIG. 5.

Referring now to FIGS. 2 and 3, waterproof outer casing 13 has a pair of forward bellow sections 31 through which axle 17 is rotatably attached and a pair of rear bellows sections 32 through which rear axle 18 is rotatably attached. Fill plug 33 is centrally located in outer casing 13 to the inside for filling the entire housing with a suitable electrically insulating liquid fluid such as oil. Resilient strip 20 has a plurality of ribs 36 which cooperate with the cross-sectional shape of end 28 of coupling plug 27 (FIG. 6). Front wheels 14 and rear wheels 16 each have a plurality of cogs 37 for frictionally engaging cleats 24. Mounting bolts 38 are threadably engaged with inside frame 41 and couple outer casing 13 to inside frame 41. A threaded recess 39 in mounting bolts 38 allow for a threadable engagement of mounting screws therewith without disturbing the water-tight integrity of outer casing 13.

Figure 4:
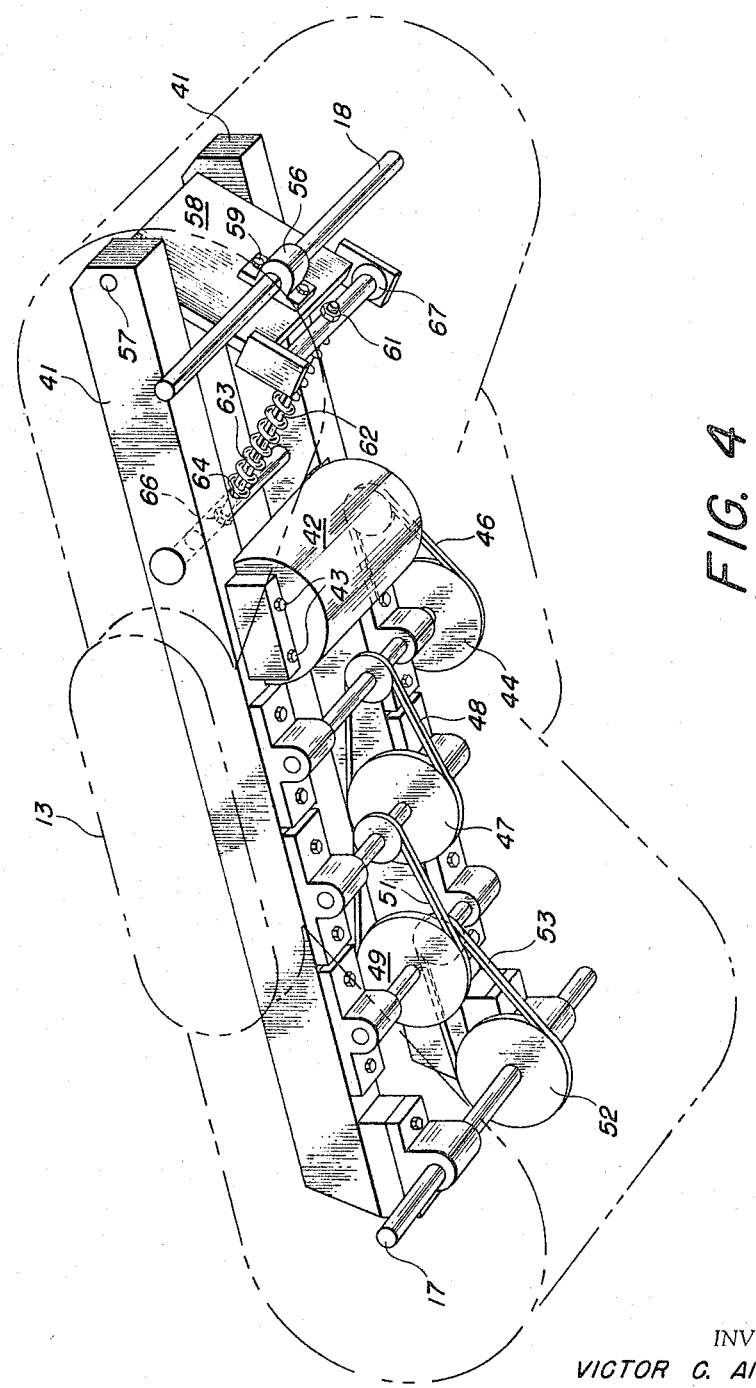
FIG. 4 is a perspective view of the inside frame and attached mechanisms showing the outer shell in phantom.

Referring to FIG. 4, inner frame 41 has an electric motor 42 mounted thereto by mounting screws 43. Electric motor 42 is coupled to sprocket 44 by V-belt 46. Sprocket 44 is coupled to sprocket 47 by V-belt 48. Sprocket 47 is coupled to sprocket 49 by V-belt 51. Sprocket 49 is coupled to sprocket 52 by V-belt 53. Each of the said sprockets 44, 47, 49 and 52 are bolted to inner frame 41. Sprocket 52 is mechanically coupled to axle 17. All of the sprockets are coupled to inner frame 41 by suitable housings.

Rear axle 18 is rotatably held by housing 56 which is rotatably attached at 57 to frame 41. Housing 56 is bolted to mounting block 58 at 59. Adjusting nut 61 is threadably mounted on shaft 62 which is carried within compression spring 63 and is pivotally and slidably attached to frame 41 at 64 by retaining nut 66. Shaft 62 is pivotally and slidably attached to mounting block 58 at 67.

Figure 5:
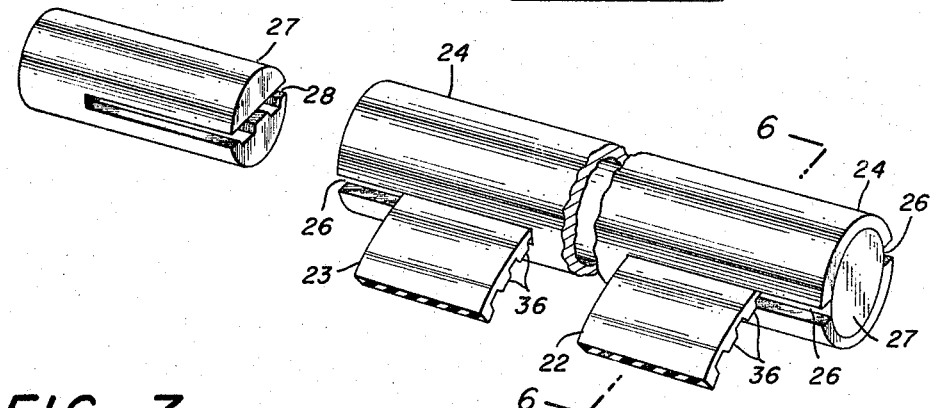
FIG. 5 is a perspective view of one of the cylindrical cleats of the track of the present invention with a coupling plug utilized in conjunction with the cylindrical cleat in spacial relationship thereto.

Referring to FIGS. 5 and 6, cylindrical cleat 24 has mounting slots 26 cut therein with plugs 27 inserted in each end. Plug 27 is dimensioned for a snug slidable fit within cylindrical cleat 24 as shown spacially disposed from the cylindrical cleat 24. Plug 27 is contoured at one end for a snug fit around the resilient belt ribs (FIG. 6).

Figure 7:
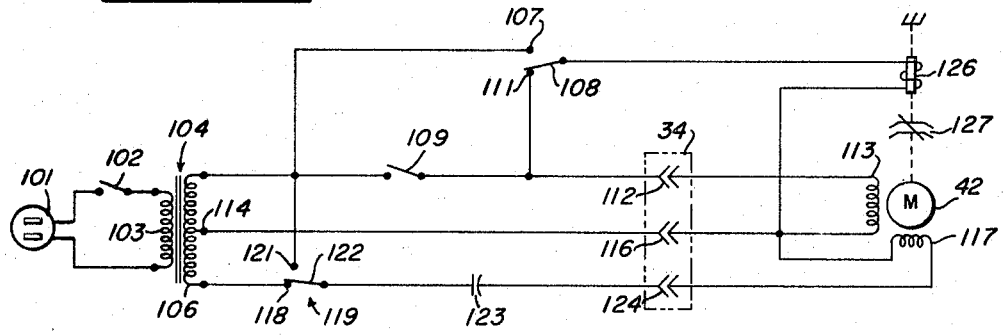
FIG. 7 is a schematic diagram of the control circuitry of the present invention.

Referring to FIG. 7, plug 101 couples electric power through master on-off switch 102 to primary 103 of power transformer 104. The top of secondary 106 of transformer 104 is connected to contact 107 of free-wheeling switch 108 and through motor on-off switch 109 to contact 111 of free-wheeling switch 108. Switch 109 is also coupled to pin 112 of bulkhead connector 34 and to main winding 113 of split-phase induction motor 42. Center tap 114 of secondary 106 is connected through pin 116 of bulkhead connector 34 to the other side of main winding 113 of split-phase induction motor 42 and to one side of winding 117 of motor 42. The bottom of secondary winding 106 is coupled to contact 118 of forward-reverse switch 119. Contact 121 of forward-reverse switch 119 is connected to the top of secondary winding 106. Switch arm 122 of forward-reverse switch 119 is connected through phasing capacitor 123 and pin 124 of bulkhead connector 34 to the other side of winding 117 of split-phase induction motor 42. Solenoid winding 126 is magnetically coupled to brake 127 of motor 42. One side of solenoid winding 126 is connected to the center tap 114 of secondary winding 106 through pin 116 of bulkhead connector 34 and the other side of solenoid winding 126 is connected to switch arm 128 of free-wheeling switch 108.

Operation

Referring back to FIGS. 2 and 3, it can be seen that a certain amount of distortion of the axles with respect to each other can be tolerated through the coupling of the axles to circular bellows 31 and 32. A shortening of the distance between axles 17 and 18 would merely result in the further compression of compression spring 63 with some loosening of tracks 20. The chain and sprocket coupling of electric motor 42 to front axle 17 allows for considerable angulation without affecting the drive train. This of course would not be true with a reduction gearing system. After the entire unit has been assembled, nut 61 is adjusted, which will in turn adjust the distance between axles 17 and 18 until track 20 has the proper tension. The ideal adjustment will result in the tracks being allowed to distort to the contour of outer casing 13 without breaking and without undue looseness when not distorted. The chain coupling allows the drive chain to be reversed without binding.

In coupling two or more of the modules together, a linking platform is bolted via threaded recesses 39 in mounting bolts 38 and the electric motor 42 connected via bulkhead connector 34 in pairs to a single control. Electric motor 42 is preferably an induction motor which will essentially take the place of a differential gearing system in that when if one track should bind slowing one motor down, the supply current will readjust to provide the required motor torque to accommodate the change in load.

Referring back to FIG. 7, quiescently, master on-off switch 102 is open as shown, as is on-off motor switch 109. Free-wheeling switch 128 can either be in the position indicated or the opposite position. In either position, solenoid 126 is de-energized since master on-off switch 102 is open, automatically applying brake 127 to motor 42 and the entire unit is held at a standstill. When master on-off switch 102 is thrown, this applies power through transformer 104 to contact 107 of switch 108. If the free-wheeling switch is in the free-wheeling position as shown, solenoid 126 will be energized as it will then be placed across the upper half of secondary winding 106 of transformer 104. Should it be desired that a brake 127 be applied when motor 42 is not actuated, free-wheeling switch 108 will be reversed to the motor control position, i.e. switch arm 128 will contact switch contact 111 and the solenoid 126 will only be actuated when on-off motor switch 109 is closed. This will result in brake 127 being on when motor 42 is not actuated and brake 27 will be automatically released when motor 42 is actuated through motor on-off switch 109. If it is desired that motor 42 be reversed, forward-reverse switch 119 is reversed, applying an opposite phase through phase shift capacitor 123 to winding 117 of motor 42. Main winding 113 always receives the phase from the top half of secondary winding 106 of transformer 104.

It can be seen from the above description that a remote under-water positioning and manipulation module has been provided which can be conveniently coupled to other modules in a variety of configurations and in which the moving parts are flexibly coupled to allow for transverse and angular distortion. The unit is designed to be sealed at the factory which is the purpose of the unique mounting bolts 38, i.e., the consumer need not destroy the water-tight integrity of the system while at the same time being able to bolt coupling or linking platforms directly to the frame of the unit.

It should be understood of course that the foregoing disclosure relates to only a preferred embodiment of the invention and that it is intended to cover all changes and modifications of the example of the invention herein chosen for the purposes of the disclosure which do not constitute departures from the spirit and scope of the invention.

What is claimed is:
1. A remote underwater positioning and manipulation module comprising:
   a fluid-filled water-tight housing;

a first and second pair of wheels rotatably and resiliently coupled thereto;
an electrical motor mounted within said housing, coupling means mechanically coupling said motor to one of said first and second pairs of wheels;
adjusting means for adjusting the distance between said first and second pairs of wheels; and
a plurality of flexible diaphragms in said housing for transmitting outside pressure to the inside thereof; and
an endless track coupled to said first and second pairs of wheels, said endless track completely surrounding said housing.

2. The remote underwater positioning and manipulation module of claim 1 wherein:
said flexible diaphragms comprise circular bellows having concentric convolutions.

3. The remote underwater positioning and manipulation module of claim 1 wherein:
said first and second pairs of wheels are coupled to said flexible diaphragms.

4. The remote underwater positioning and manipulation module of claim 1 and further including:
a plurality of bolts in said housing having a threaded recess therein for threadable coupling to an outside load while maintaining water-tight integrity within said water-tight housing.

5. A remote underwater positioning and manipulating vehicle having a plurality of propulsion modules detachably coupled to each other, each of said modules comprising:
a fluid-filled water-tight housing;
a first and second pair of wheels rotatably and resiliently coupled thereto;
an electrical motor mounted within said housing, coupling means mechanically coupling said motor to one of said first and second pairs of wheels;
adjusting means for adjusting the distance between said first and second pairs of wheels; and
a plurality of flexible diaphragms in said housing for transmitting outside pressure to the inside thereof; and
an endless track coupled to said first and second pairs of wheels, said endless track completely surrounding said housing.

References Cited
UNITED STATES PATENTS

| | | | |
|---|---|---|---|
| 2,244,528 | 6/1941 | Schur | 180—2 |
| 2,321,874 | 6/1943 | Tandler | 180—1.7 |
| 2,453,750 | 11/1948 | Kamlookhine | 305—31 |
| 2,627,832 | 2/1953 | Gagliano | 115—1 X |
| 2,695,819 | 11/1954 | Parsons | 305—40 |

FOREIGN PATENTS 583,885   1/1947   Great Britain.

RICHARD J. JOHNSON, *Primary Examiner.*